United States Patent [19]
Garrett et al.

[11] 3,856,037
[45] Dec. 24, 1974

[54] VALVE SEQUENCE INTERLOCK SYSTEM

[75] Inventors: Michael R. Garrett; Samuel W. Putch; Norman A. Nelson, all of Houston, Tex.

[73] Assignee: FMC Corporation, San Jose, Calif.

[22] Filed: Jan. 22, 1973

[21] Appl. No.: 325,490

[52] U.S. Cl.............. 137/236, 137/613, 137/637.1, 166/0.5, 166/53, 166/72
[51] Int. Cl.......................... E21b 7/12, F17d 17/00
[58] Field of Search................ 137/236, 613, 637.1; 166/0.5, 53, 67, 72; 251/32, 94

[56] References Cited
UNITED STATES PATENTS

| | | | |
|---|---|---|---|
| 1,832,883 | 11/1931 | Thomas | 137/613 X |
| 1,936,373 | 11/1933 | Adelson | 137/613 X |
| 2,073,553 | 3/1937 | Dienst | 137/637.1 X |
| 2,741,262 | 4/1956 | Crookston | 137/613 X |
| 3,165,121 | 1/1965 | Strauss et al. | 251/94 X |
| 3,633,667 | 1/1972 | Falkner | 166/0.5 |

FOREIGN PATENTS OR APPLICATIONS

| | | | |
|---|---|---|---|
| 266,675 | 4/1970 | U.S.S.R. | 166/72 |
| 1,110,309 | 4/1968 | Great Britain | 166/0.5 |

*Primary Examiner*—Alan Cohan
*Assistant Examiner*—Gerald A. Michalsky
*Attorney, Agent, or Firm*—W. W. Ritt, Jr.; C. E. Tripp

[57] ABSTRACT

A valve sequence interlock system for assuring the operation of a plurality of valves in a predetermined sequential manner. The system is described as employed in an offshore oil or gas well platform completion to control a downhole safety valve, a subsea safety valve, and a surface safety valve all in the same tubing string, so that the surface valve always closes first and opens last, and so that it is impossible to change the operating mode of the subsea and downhole valves when the surface valve is open. The surface valve is actuated by pneumatic pressure, and the subsea and downhole valves are hydraulically actuated.

15 Claims, 4 Drawing Figures

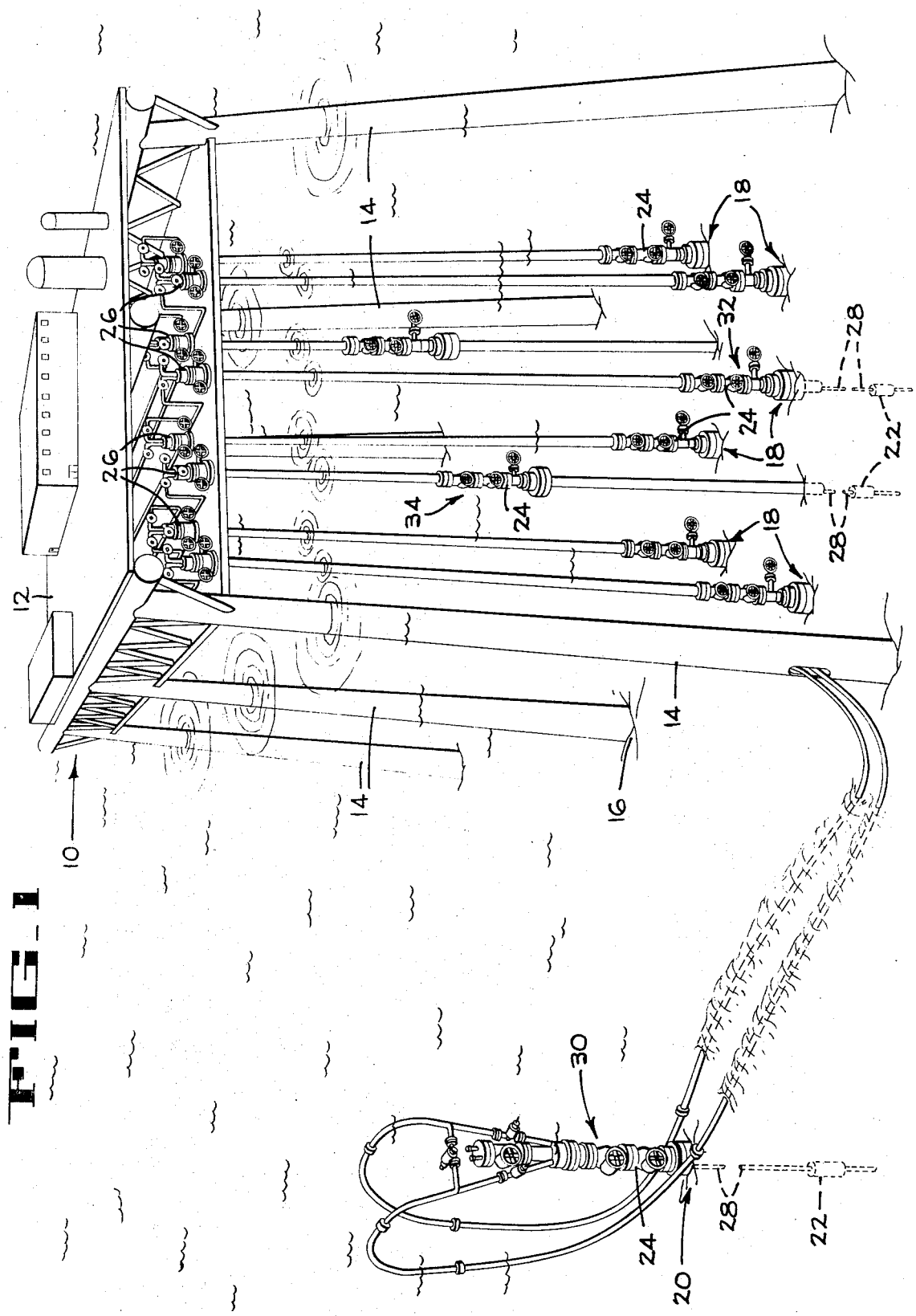

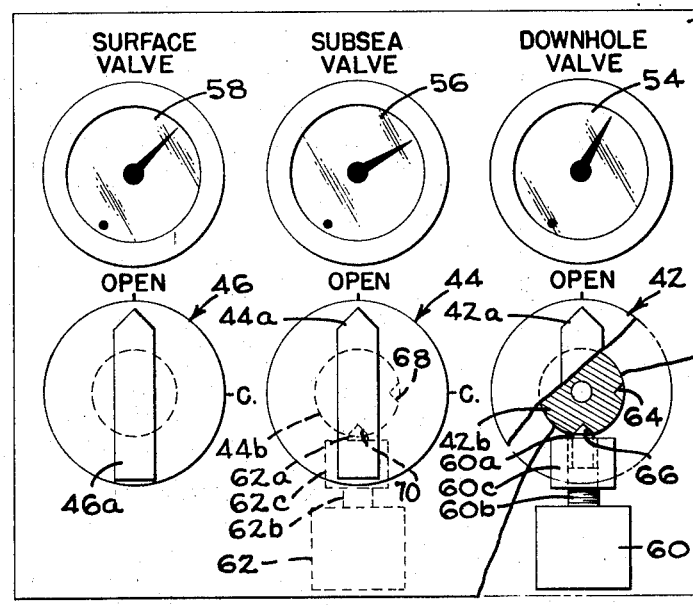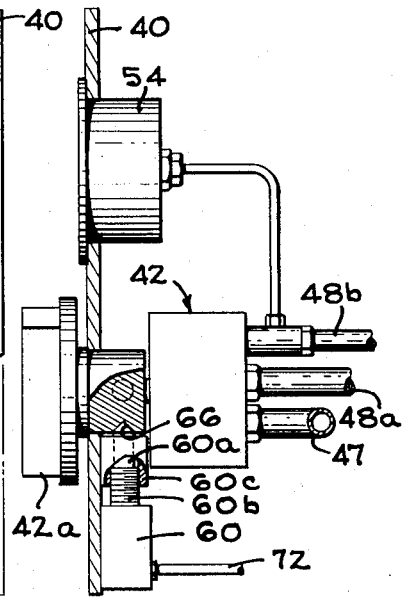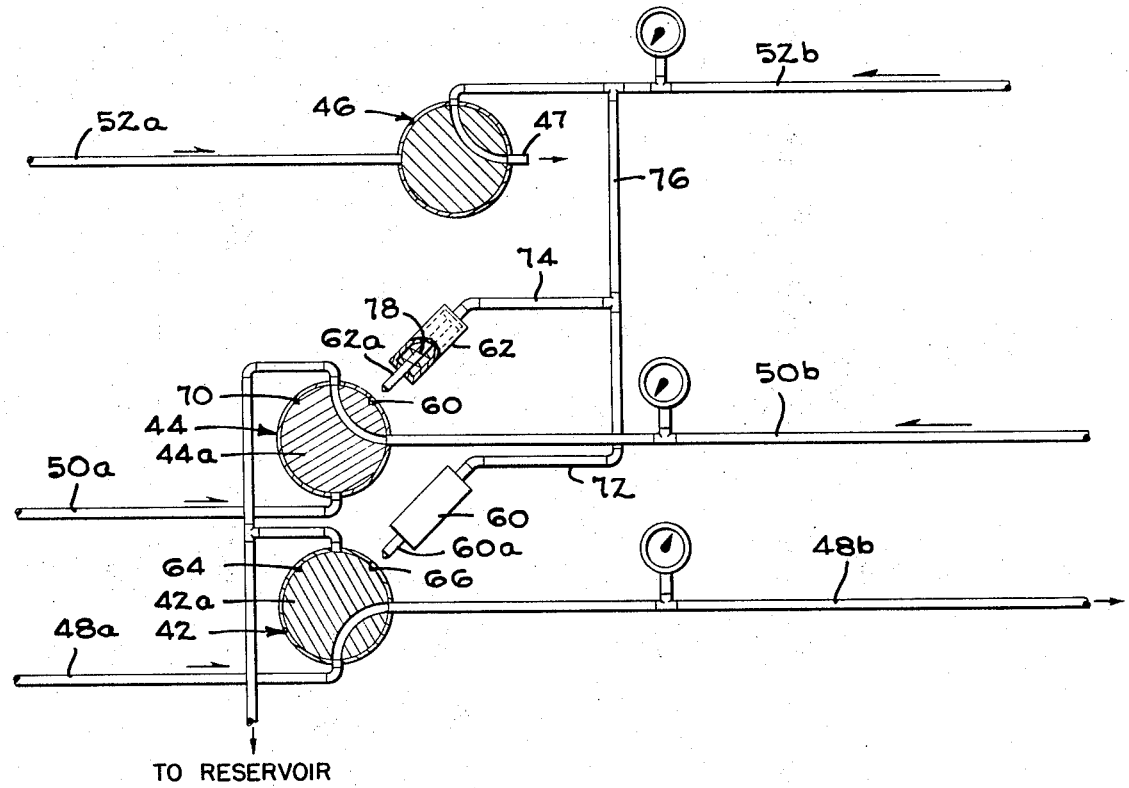

VALVE SEQUENCE INTERLOCK SYSTEM

BACKGROUND OF THE INVENTION

The field of art to which the present invention pertains includes valve control systems, and more particularly systems for controlling the operation of oil or gas well valves in a predetermined, sequential manner.

Various regulations with respect to oil and gas well platform completions offshore the continental United States have been established by the U.S. Geological Survey for the protection of personnel, property, and the environment. Among these regulations is the requirement that hydraulically actuated "fail close" safety valves be installed downhole in the well's tubing strings in addition to pneumatically actuated "fail close" safety valves employed above the water level at the platform. Some oil companies are going even further in their efforts to provide adequate protection under the most adverse conditions by installing additional hydraulically actuated "fail close" subsea safety valves in the water beneath the platform where they will not be affected by fire, storms, floating objects, etc., and where they can be serviced or replaced with minimum difficulty.

Generally speaking, the control system for such a three-valve arrangement requires a 30 p.s.i. pneumatic supply for the surface valve, a 1,500 p.s.i. hydraulic supply for the subsea valve, and a 6,000 p.s.i. hydraulic supply for the downhole valve. Furthermore, it is necessary to equip each well with its individual control manifold to facilitate closing its valve during normal operating practices as well as to provide for periodic confirmation of each valve's integrity. Because of the erosion problems encountered in oil well flow, the practice is always to first close the downstream valve, i.e., the surface valve in this three-valve arrangement, and to open it last so that it bears virtually all of the erosive action of the fluid flowing from the well. In this way the longevity of the subsea and downhole valves is greatly prolonged, and servicing or replacement of the eroded valve is significantly simplified.

Various systems for controlling the operation of well valves are described in several patents, perhaps the most relevant being U.S. Pat. No. 3,027,945 that discloses a polarized light-actuated remote control system, and U.S. Pat. No. 3,419,076 covering a system that causes automatic closure of a subsurface valve upon a change in temperature of wind velocity in the vicinity of the wellhead, or a change in the attitude of the wellhead platform. These teachings, however, fail to even suggest how operation of a surface, subsea and downhole three-valve system can be restricted to a predetermined sequence, and it is this type of operation that constitutes one of the objects of the present invention.

Another object of this invention is to overcome the problem of assuring control of the valves in an offshore well tubing string so that the downstream valve always opens last and closes first.

Another object of the present invention is to reduce to a minimum the erosion problem associated with the opening and closing of downhole and subsea valves in an offshore well flow conduit.

Still another object of the present invention is the provision of an interlock system for three fluid pressure-actuated, "fail close" valves arranged in series in a well flowline, ensuring to each valve complete freedom for self-closure upon failure of the fluid pressure holding it open, and yet preventing the two upstream valves from being opened or closed by an operator or other individual unless the downstream valve is closed.

A further object of the present invention is to provide a relatively un-complex, yet highly reliable, valve interlock system that assures control of offshore well safety valves in a fully approved manner.

SUMMARY OF THE INVENTION

This invention comprises a system for controlling the sequential operation of a plurality of fluid-actuated valves positioned in series relationship in a common conduit, such as a flowline from an offshore oil or gas well, the system assuring that a predesignated one of these valves always must be in its closed position before the remaining valve or valves can be opened or closed. More specifically, the invention involves a mechanical interlock system for employment with a pneumatic-actuated safety valve and a pair of hydraulic-actuated safety valves arranged in series in a well tubing string, the system including a pneumatic control valve for the pneumatic-actuated safety valve, an hydraulic control valve for each hydraulic-actuated safety valve, an individual pneumatic-actuated cylinder for locking each of the hydraulic control valves, and a pneumatic line interconnecting the pneumatic cylinders and the line conducting pressure to the pneumatic-actuated safety valve. With the hydraulic-actuated safety valves located in the tubing string upstream of the pneumatic-actuated safety valve, the interlock system is arranged so that the pneumatic control valve must be closed, and hence the pneumatic-actuated safety valve itself must be closed, before the hydraulic control valves and thus the hydraulic-actuated safety valves themselves, can be opened or closed. The pneumatic cylinders are arranged to mechanically engage and prevent change of position or mode of their respective control valves when subjected to pneumatic pressure, and to disengage from their control valves when depressurized, as by means of a spring functioning to return or retract the cylinder's piston rod upon venting of pressure in their pneumatic supply lines.

In the illustrated embodiment of the invention, the control valves of the interlock system are quarter-turn units that function to either open or close the pneumatic and hydraulic lines to the tubing string's safety valves that they control, and the pneumatic cylinders are positioned so that the external ends of their piston rods engage detents or the like in the control valve's handles when these cylinders are pressurized. Thus, when the pneumatic control valve is in its open position the tubing string's pneumatic-actuated safety valve, i.e., the downstream valve, is pressurized and therefore open, and the pneumatic cylinders are pressurized and therefore mechanically lock the hydraulic control valves against change of mode. Conversely, when the pneumatic control valve is in its closed positon the pneumatic-actuated safety valve is not pressurized and therefore is closed, and the pneumatic cylinders likewise are unpressured so that their return springs hold their piston rods in retracted position, i.e., disengaged from the hydraulic control valves' handles, with the result that the hydraulic control valves can be opened or closed to actuate the tubing strings hydraulic-actuated safety valves with which they are associated.

BRIEF DESCRIPTION OF THE DRAWINGS

FIG. 1 is a schematic view in perspective of an offshore oil well platform completion employing downhole, subsea, and surface safety valves in each tubing string, i.e., a completion for which the present invention is primarily designed.

FIG. 2 is a front elevation, partially broken away, of an individual well control panel as used in the completion depicted in FIG. 1, showing an interlock system according to the present invention employed to lock a pair of hydraulic control valves in their open position.

FIG. 3 is a side elevation of the panel of FIG. 2, with parts broken away to better illustrate the elements of one of the hydraulic control valves and the pneumatic cylinder for locking it.

FIG. 4 is a schematic of a valve interlock system according to the present invention, showing the pneumatic control valve in its closed position, i.e., venting pneumatic pressure from the closed surface safety valve with which it is associated, and also showing the pneumatic cylinders disengaged from the hydraulic control valves, one hydraulic control valve closed, and the other hydraulic control valve open.

DESCRIPTION OF THE PREFERRED EMBODIMENT

Referring first to FIG. 1, the present invention is primarily designed for employment with an offshore oil or gas well platform completion 10, comprising a well platform 12 supported on pilings 14 extending from the ocean floor or mudline 16 to a suitable level above the water's surface, and one or more offshore wells positioned either below the platform at 18 or laterally therefrom as at 20.

To assure maximum safety and control, the wells 18, 20 are completed with three "fail close" safety valves 22, 24 and 26 in series in each of their tubing strings 28. In each of these three-valve completions the valve 22 is located downhole in the string below the mudline 16, the valve 24 is positioned in the string in a subsea location either at the mudline, such as in a subsea tree 30 or 32, or at some suitable location between the mudline and the water's surface, such as in a subsea tree 34 positioned approximately 66 feet below the surface, and the valve 26 is located on the platform where it is readily accessible for quick and easy servicing or replacement. Thus, with flow proceeding in the normal direction from the well to the platform the valves 26 are in the most downstream position, the valves 22 are in the most upstream position, and the valves 24 are in a position intermediate therebetween.

Each of the safety valves 22, 24, is of the "fail close," hydraulically actuated type commonly employed in offshore completions, and the surface safety valve is also a "fail close" type but is pneumatically actuated. Actuation of the surface safety valves 26 can be achieved with, for example, a 30 p.s.i. pneumatic-supply, the subsea safety valves 24 with a 1,500 p.s.i. hydraulic supply, and the downhole safety valves with a 6,000 p.s.i. hydraulic supply, each supply source being connected to the related valves by fluid lines in the usual manner. Accordingly, when the pressure form a supply source is admitted to the actuator of a valve the valve will open, and when the pressure is removed, either by rupture or other failure of the fluid line or by venting the line either to atmosphere (in the case of a pneumatic system) or to a reservoir (as in a hydraulic system), the valve will automatically close.

In order that the erosive forces of fluid flow through the valves 22, 24, 26 be restricted as much as possible to the surface valves 26, so that servicing and/or replacement can be accomplished in the most efficient manner, it is necessary to assure that neither the subsea valves 24 nor the downhole valves 22 are either opened or closed unless the surface valves are closed, thereby preventing fluid flow through the respective flowlines. However, it also is mandatory that each of the safety valves 22, 24, 26 are free to close automatically in the event of an emergency. These requirements are fully satisfied by the interlock system of the present invention, an embodiment of which is illustrated in some detail in FIGS. 2–4.

With regard first to FIGS. 2 and 3, in the foregoing described offshore platform completion each well 18, 20 is provided with its distinct control panel 40 mounted at a suitable location on the platform 12. Each panel 40 contains an hydraulic control valve 42 in a line 48a, 48b (FIGS. 3 and 4) running from an hydraulic pressure supply (not shown) to the well's downhole safety valve 22, an hydraulic control valve 44 in a line 50a, 50b (FIG. 4) between the subsea safety valve 24 and its hydraulic pressure supply (not shown), and a pneumatic control valve 46 in a line 52a, 52b (FIG. 4) from a pneumatic pressure supply to the well's surface safety valve 26. The panel 40 also contains fluid pressure gauges 54, 56, 58 to indicate the pressure in the lines running from the control valves 42, 44, 46 respectively to the downhole, subsea, and surface safety valves 22, 24, 26 respectively.

Each of the three control valves 42, 44, 46 has two functional conditions, designated as "open" and "c" (for "closed") on the panel 40, and changing from one to the other is achieved by rotation of the valves' handles 42a, 44a, 46a approximately 90° from one designation towards the other. When the pneumatic control valve 46 is opened (FIG. 2) it provides continuity between the line 52a (FIG. 4) from the pneumatic pressure supply (not shown) and the line 52b to the related surface safety valve 26, thereby conducting pressure to this valve 26 which then opens. On the other hand, when the pneumatic control valve 46 is closed as shown in FIG. 4, the line 52a from the pressure supply is shut off and the line 52b from the surface safety valve 26 is vented to the atmosphere, as through a line 47, so that the valve 26 accordingly closes. In similar manner, when the hydraulic control valve 44 is opened (FIG. 2) it conducts fluid pressure from the supply thereof to the line 50b (FIG. 4) running to the subsea safety valve 24, causing the valve 24 to open, and when the control valve 44 is closed (FIG. 4) it shuts off the hydraulic supply line 50a and vents the line 50b from the subsea safety valve 24 to a reservoir (not shown) for the hydraulic fluid, with the result that the valve 24 closes. The hydraulic control valve 42 functions in analogous fashion to the control valve 44, i.e., when it is opened (FIGS. 3 and 4) it conducts hydraulic pressure in the line 48a from the supply thereof to the line 48b running to the related downhole valve 22, causing this valve 22 to open, and when the valve 42 is closed (not shown)

it shuts off the line 48a and vents the line 48b to a fluid reservoir, thereby causing the valve 22 to close.

In order to assure that neither of the hydraulic control valves 42, 44 is operated while the pneumatic control valve is open, thereby assuring that neither the downhole safety valve 22 nor the subsea safety valve 24 is opened or closed while the surface safety valve is open, a pair of pneumatic cylinders 60, 62 (FIGS. 2 and 3) are mounted on the panel 40 and oriented so that their piston rods 60a, 62a which are axially slidable in threaded positioning elements 60b, 62b, and guides 60c, 62c, respectively, extend toward cylindrical stems 42b, 44b, respectively, of the hydraulic control valve handles 42a, 44a, respectively. The outer periphery of the valve handle stem 42b is provided with dimples or holes 64, 66 spaced approximately 90° apart, and in similar manner the valve handle stem 44b is dimpled, etc., at 68, 70. The spacial relationship between the cylinder 60 and the dimples 64,66 is such that when the control valve 42 is open the cylinder's piston rod 60a is aligned with the dimple 66, and when the valve 42 is closed the piston rod 60a and the dimple 64 are in alignment. Likewise, the spacial relationship between the cylinder 62 and the dimples 68, 70 results in the piston rod 62a and the dimple 70 being in alignment when the control valve 44 is open, and when this valve is closed the dimple 68 lines up with the piston rod 62a.

The illustrated cylinders 60, 62 are of the single-acting, spring return variety, and are connected by pneumatic branch lines 72, 74 respectively, and a trunk 76 to the pneumatic line 52b running from the pneumatic control valve 46 to the surface safety valve 26. Accordingly, when the control valve 46 is open (FIGS. 2 and 3) the pneumatic pressure coming from the supply through line 52a is conducted to the cylinders 60, 62 as well as to the surface safety valve 26. This pressure extends the cylinders' piston rods 60a, 62a into the respective control valve handle dimples that happen to be in alignment therewith, securely locking the handles against rotation and thus preventing their valves and the safety valves 22, 24 from being operated. When the control valve 46 is closed (FIG. 4) the return spring 78 in the cylinder 62 and the return spring (not shown) in the cylinder 60 retract the piston rods 62a, 60a, respectively, thereby disengaging these rods from the dimples and freeing the control valve handles 42a, 44a for rotation to either open or close the downhole and subsea safety valves 22, 24 respectively.

From the foregoing it can be seen that the interlock system of this invention provides a positive, efficient, and otherwise highly satisfactory means for assuring that the downhole and subsea safety valves of a three-valve safety completion system in an offshore oil or gas well cannot be operated by an attendant or other personnel unless the surface safety valve is closed, and that this interlock system interferes in no way with the required automatic closure of any and all of these three safety valves when an emergency occurs or pressure to them is otherwise removed.

Although the best mode contemplated for carrying out the present invention has been herein shown and described, it will be apparent that modification and variation may be made without departing from what is regarded to be the subject matter of the invention.

We claim:

1. A fluid flow control system for a well flow conduit, comprising:
   1. a plurality of fluid-actuated valves installed in series relationship in a well flow conduit,
   2. a fluid pressure conduit system interconnecting each of said valves and a fluid pressure source for actuation of said valves,
   3. a plurality of fluid pressure control valves positioned in said fluid pressure conduit system for respective individual regulation of the admission of fluid pressure from said source to said fluid-actuated valves, and
   4. an interlock system for assuring the operation of said fluid-actuated valves in a predetermined sequence, said interlock system including:
      a. restricting means actuatable to prevent operation of at least a certain one of said plurality of control valves, and
      b. control means for said restricting means, said control means comprising fluid conduit means interconnecting said restricting means and said fluid pressure conduit system so that said certain control valve restricting means is operated by valve-actuating fluid pressure in said fluid conduit means when a selected remaining one of said control valves is in a predetermined first condition to actuate its said fluid-actuated valve and said restricting means is rendered inoperative when said selected control valve is in a predetermined second condition to de-actuate its said fluid-actuated valve, whereby placing said selected control valve in said first condition results in opening its said fluid-actuated valve and operating said restricting means to prevent operation of said certain control valve and associated fluid-actuated valve, and placing said selected control valve in said second condition results in closing its fluid-actuated valve and rendering said restricting means inoperative to facilitate operation of said certain control valve and fluid-actuated valve.

2. A fluid flow control system according to claim 1 wherein said fluid-actuated valves are fail-close safety valves.

3. A fluid flow control system according to claim 2 wherein said safety valves include a downhole valve, a subsea valve, and a surface valve.

4. A fluid flow control system according to claim 1 wherein said restricting means includes at least one fluid cylinder with a piston rod arranged to cooperate mechanically with said one control valve.

5. A fluid flow control system for a well flow conduit, comprising:
   1. a plurality of fluid-actuated valves installed in series relationship in a well flow conduit,
   2. a fluid pressure conduit system interconnecting each of said valves and a fluid pressure source for actuation of said valves,
   3. a plurality of fluid pressure control valves positioned in said fluid pressure conduit system for individual regulation of the admission of fluid pressure from said source to said fluid-actuated valves, and
   4. an interlock system for assuring the operation of said fluid-actuated valves in a predetermined sequence, said interlock system including;
      a. restricting means actuatable to prevent operation of at least one of said plurality of control valves, said restricting means including at least one fluid cylinder with a piston rod arranged to cooperate mechanically with said one control valve, and b. control means for said restricting means, said control means comprising a fluid pressure line interconnecting said fluid cylinder and that portion of said fluid conduit system interconnecting another of said control valves and one of said fluid-actuated valves, so that said fluid cylinder is actuated when said other control valve is in a predetermined first condition and de-actuated when said other control valve is in a predetermined second condition, whereby placing said other control valve in said first condition results in opening one of said fluid-actuated valves and actuating said restricting means to prevent operation of the remaining control valves and fluid-actuated valves, and placing said other control valve in said second condition results in closing said one fluid-actuated valve and de-actuating said restricting means to facilitate operation of the remaining control valves and fluid-actuated valves.

6. A fluid flow control system according to claim 5 wherein said fluid cylinder is a single-acting, spring-return cylinder, said one control valve has a rotatable handle that is engaged and held against rotation by said piston rod when said cylinder is subjected to fluid pressure, and said one fluid-actuated valve is a surface safety valve.

7. A fluid flow control system according to claim 6 wherein said plurality of fluid-actuated valves include a subsea safety valve upstream of said surface valve, and a downhole safety valve upstream of said subsea valve.

8. A fluid flow control system according to claim 7 including a control valve for each of said subsea and downhole valves, and a fluid cylinder for the control valve for each of said subsea and downhole valves to prevent operation of said subsea and downhole valves and their control valves when said surface safety valve is open.

9. A valve sequence interlock system for use at an offshore well platform completion to control the operation of a plurality of safety valves installed in series in a well flow conduit, said platform completion including first and second control valves individually connected to first and second safety valves by first and second fluid pressure lines, said interlock system comprising:

1. controllable restricting means actuatable to prevent operation of said second control valve, and thus operation of said second safety valve, when said first safety valve is open, and
2. fluid conduit means interconnecting said restricting means and said first pressure line to conduct fluid pressure to said restricting means when said first control valve is open.

10. A valve sequence interlock system according to claim 9 wherein the controllable restricting means comprises a fluid cylinder with a piston rod actuatable by admission of fluid pressure thereto.

11. A valve sequence interlock system according to claim 10 wherein said second control valve includes a rotatable handle with means engageable by said piston rod to prevent rotation of said handle, and thus operation of said control valve.

12. A valve sequence interlock system according to claim 11 wherein said fluid cylinder is a single-acting spring return unit arranged so that its piston rod extends into locking engagement with said second control valve's handle upon opening said first control valve, and whereby said piston rod retracts from said locking engagement in response to spring-return action when said first control valve is closed.

13. A valve sequence interlock system according to claim 12 including a third control valve, a fluid cylinder for preventing operation of said third control valve, and fluid conduit means interconnecting said third control valve's fluid cylinder to said first pressure line.

14. A valve sequence interlock system according to claim 13 wherein said third control valve controls the admission of fluid pressure to a third safety valve.

15. A valve sequence interlock system according to claim 14 wherein said first safety valve is downstream to both of said second and third safety valves, and wherein said system prevents the operation of said second and third safety valves by operation of said second and third control valves unless said first safety valve is closed.

* * * * *